Inventors:
Erich Shulze-Herringen
Fritz Gutzmann
by E. D. Phinney
Attorney

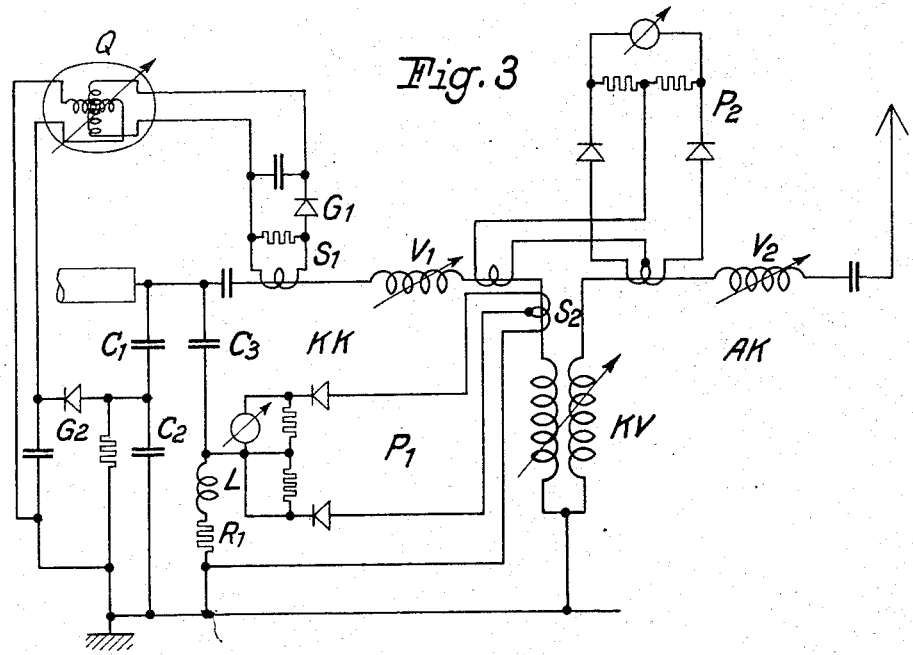

Patented Sept. 29, 1942

2,297,255

UNITED STATES PATENT OFFICE 2,297,255

PHASE CONTROL IN HIGH FREQUENCY COUPLED CIRCUITS

Erich Schulze-Herringen, Berlin, Germany, and Fritz Gutzmann, Schoneiche, near Berlin, Germany; vested in the Alien Property Custodian Application July 22, 1939, Serial No. 285,846 In Germany July 26, 1938

5 Claims. (Cl. 172—245)

It is in many cases necessary in high frequency transmission to accurately stabilize the phase relation of coupled oscillatory circuits. Up to the present time only approximate methods have been used, such as, for instance, by the matching of two adjacent circuits to obtain a maximum current ratio or by other similar means.

Such operations, when applied to more than two circuits, entail still further complications and expenditure of time in order to obtain accurate adjustment.

The present invention discloses a means of effecting fast and accurate phase control under load, in which the correct setting is obtained directly through the measurement of the phase angles of the currents flowing in the coupled circuits. The proposed method has no effect upon the correct adjustment of a preceding circuit.

Now, correct phase adjustment is attained when the currents of two adjacent circuits are in quadrature. The actual measurement of these phase conditions may be accomplished by the use of a bridge and a measuring instrument. This bridge determines the condition of phase quadrature on a zero-reading instrument. The invention is illustrated below in Figs. 1-4 showing some typical applications with reference to circuit diagrams.

Figure 1:
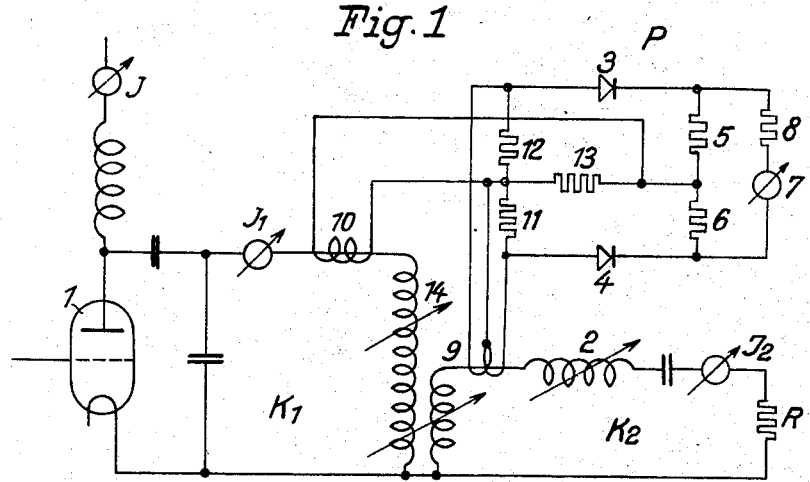

Fig. 1 shows the device in its simplest application, in which only two mutually coupled circuits are to be regulated. In the illustrated arrangement a transmitting tube 1 works into an impedance R through two coupled circuits K1 and K2. The phase adjustment of the circuit K2 is accomplished, for example, by means of the variable inductance 2. The phase bridge P is used to control this adjustment and constitutes an example of the invention. This phase bridge consists of the rectifiers 3 and 4, the impedances 5 and 6, the zero-reading instrument 7 and its internal series impedance 8, the coupling coils 9 and 10 with their shunt impedances 11, 12, and 13. The coupling coils 9 and 10 are arranged, for example, as current converters; coupling coil 9 is coupled to the circuit K2, and coil 10 to the circuit K1. The meter 7 of the phase bridge registers zero when the voltage across the impedances 11 and 12 has a phase difference of 90 degrees with respect to the voltage drop appearing across the impedance 13. Depending upon circuit conditions the circuit K2 is phase-controlled by adjustment of the variable inductance 2 by means of the phase bridge P and the zero reading meter 7 while the circuit K1 is adjusted for minimum plate current under the control of the variable inductance 14, as indicated from the reading of the plate-ammeter J. The alteration of the conditions in circuit K1 by the variable inductance 14 will not affect the reading of meter 7 of the phase bridge P, because the phase indication of the zero reading meter is independent of the amplitude of current changes in the phase bridge.

Figure 2:
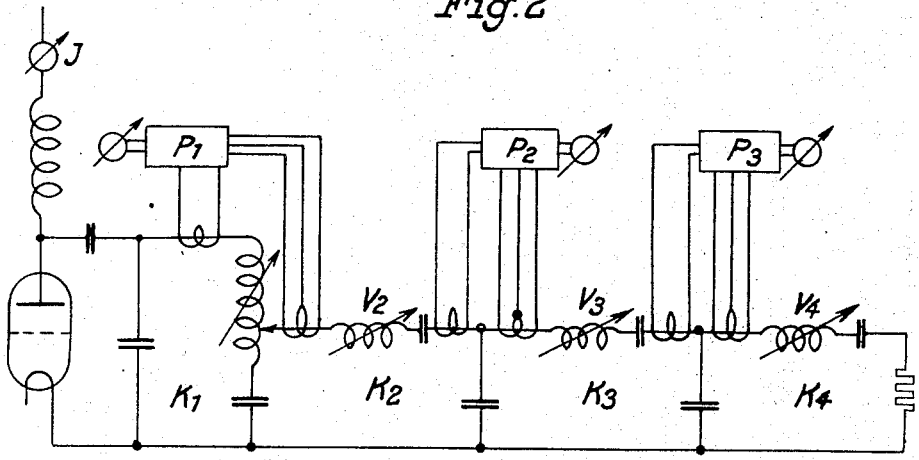

The invention is not confined to the illustrated application of Fig. 1, which only involves the phase adjustment of two coupled circuits, but is likewise applicable to a larger number of coupled circuits. Under such conditions a phase bridge of the aforementioned nature, as illustrated in Fig. 1, can be connected to each two adjacent coupled circuits. A typical illustration of this arrangement is shown in Fig. 2, in which four coupled circuits K1, K2, K3, and K4 are shown as well as the corresponding phase bridges P1, P2, P3. The phase adjustments are begun with the last circuit K4 with the help of the phase bridge P3. Then K3 is controlled with P2, K2 with P1, and finally K1, is adjusted to the plate current minimum, which is noted on the ammeter J.

A further application, which is illustrated in Fig. 3, shows the case of an antenna coupling matched to a cable. In Fig. 3, AK is an antenna circuit and KK a cable circuit. The phase adjustment of the antenna circuit AK with respect to the cable termination is made by using the phase bridge P2 and the phase adjustment of the cable circuit with its termination by use of the phase bridge P1.

The phase bridge P1 is coupled to circuit KK by the coil S2 as already described. The other branch of the phase bridge is coupled across the condenser C3 inductance L and impedance R1. Cable voltage appears across the condenser C3 according to circuit conditions, and is in phase with the current in the coil S2. Accordingly, since the phase bridge indicates voltages in quadrature by a zero reading, for such a reading the voltage across the impedance R1 must be in quadrature with the cable potential.

Furthermore, it is important as far as the cable termination is concerned to couple the proper impedance to the cable, so that the coupled termination impedance will match the characteristic impedance of the cable (for example 60 ohms). If the circuit KK and the phase bridge P1 are in proper phase adjustment, the cable load appears as a pure resistance and the indication of the crossed-coil meter measuring instrument shows only a pure effective resistance. If a pure inductance or other form of impedance be used as a coupling between the cable and antenna circuits, so that neither the circuit AK nor the circuit KK is brought out of adjustment, the terminal impedance can through the adjustment of this coupling be brought to a zero value by making a simple impedance reading on the meter Q. The matching adjustment of the antenna circuit to the cable can thus be accomplished simply and quickly by three manual operations, each for a separate component.

The measurement of the cable terminal impedance has previously been accomplished by the separate use of a voltmeter and an ammeter. To make possible a simultaneous reading of the impedances and to avoid a double reading, it is proposed, that the impedance measurement be made with the help of a crossed-coil instrument. This instrument is designated in Fig. 3 by the letter Q. It is well known that a crossed-coil meter indicates a current ratio. In the arrangement of Figure 3 one coil circuit of the crossed-coil meter carries the cable current through a rectifier G1 and a coupling coil S1, and the other coil circuit carries a current proportional to cable voltage as delivered to the rectifier G2, the voltage across which is determined by the potentiometer C1, C2 and which voltage is proportional to cable potential. The crossed-coil meter will, because it measures the voltage to current ratio, indicate ohms, e. g. according to the use of a 60-ohm cable a variation from about 30 to 90 ohms may be noted. The phase adjustment of the antenna unit, with respect to the coupling circuit, as it is shown in Fig. 3, is accomplished by the following means:

The antenna circuit is adjusted in phase by the zero method variable inductance V2 and the phase bridge P2. Then the cable circuit KK is phase-adjusted by the zero method with the variable inductance V1 and the phase bridge P1. The correct impedance for terminating the cable is coupled into the circuit through the variable coupling KV with the help of the crossed-coil meter Q, that is, the variable coupling KV is regulated to 60 ohms to terminate a 60-ohm cable.

The phase bridge may also be used automatically to adjust one or more circuits to correct phase relation. To illustrate, when a misadjustment occurs in the phase bridge as indicated by negative or positive direction of current, this current can be used to control respectively a relay and a motor, which motor is in motion as long as the phase-adjusting operation is be made, that is, until the currents in the phase bridge are balanced to a meter reading of zero, whereupon the motor is automatically disconnected by the relay. In the phase adjustment of more than two circuits the corrections can be accomplished, for example, as shown in Fig. 2: First, the variable inductance V4 is used to adjust circuit K4 through the help of phase bridge P3. Then, after the setting of this circuit, the circuit K3 is automatically brought into operation through the operation of a relay, which also releases the phase bridge P2 from operation. In a similar manner circuit K3 is adjusted by the inductance V2, and subsequently the circuit K2 may be automatically set by the phase bridge P1 and then released by a relay. After the adjustment of inductance V2 the circuit K1 is automatically controlled by a relay according to the minimum plate current or by a similar expedient.

According to a further feature of the invention provision is made in a similar way for the phase control of a plate oscillatory circuit. Since plate oscillatory circuits operate with small reactive loads, e. g. loads with real to imaginary power ratios of 4:1, the phase adjustment of 180 degrees between the alternating-current plate voltage and the alternating-current control grid voltage is distorted and direct phase opposition no longer exists. This condition is, however, necessary for good operating efficiency of the transmitter, since the efficiency is $\eta = \frac{1}{2}jH \cdot \cos \varphi$. Consequently, when both circuits are in phase the value of $\cos \varphi$ is unity, from which it follows that efficiency is then at a maximum. The invention further shows a method for reducing the phase relation of 180 degrees between grid and plate potentials to 90 degrees so that then with the help of the above-mentioned phase bridge P this voltage measurement can be made.

An example illustrating a phase adjustment of 180 degrees is shown in Fig. 4, in which R1 and R2 are the tubes of a push-pull stage. C1 and C4 are tank circuit condensers, C5 and C6 plate blocking condensers, and L1 the coil of the oscillatory circuit. The secondary circuit of the transformer K is loaded by the impedance Ra.

The push-pull part of the phase bridge P is connected across the condensers C3 and C4 of the plate circuit, and the rectifier part across the impedance Rb. The potential drop across the impedance Rb differs in phase from the alternating-current control voltage by 90 degrees, and the resistance Rb is small in comparison with the reactance of the condenser C7. If the potential drop across the resistance Rb is in quadrature with the voltage appearing across the reactances C3 and C4, then the meter 7 of the phase bridge P registers zero. Therefore, only when the voltage drop across the resistor Rb is 90 degrees out of phase with the grid potential of the tube R1, as shown by the zero-reading on the meter 7, can a phase difference of 180 degrees exist between the alternating-current voltages of grid and plate of the tube R1.

Excitation of the phase bridge P may further be brought about by using a current converter. In this application the currents in the capacitative and inductive branches of the receiving circuit are respectively in quadrature with the alternating-current plate voltage, and consequently, in a case of an additional phase difference between the grid or plate potentials respectively, it is not necessary to operate the phase bridge. The phase adjustment of a plate oscillatory circuit by the use of the phase bridge P likewise relies upon the automatic adjustment of the plate oscillatory circuit.

What is claimed is:

1. In a high frequency system, a push-pull circuit, comprising two tubes each having at least a cathode, a grid and a plate, a grid circuit formed between the said grids and the said cathodes, a plate circuit connected across the said plates and the said cathodes, a phase-comparing circuit consisting of a differential bridge circuit comprising a pair of unilateral conducting devices, and means adapted to impress voltages from the said grid circuit and the said plate circuit upon the said differential bridge circuit in parallel and push-pull relation respectively for determining the phase relation therebetween.

2. In a high frequency system, a pair of oscillatory circuits coupled with one another, a differential bridge circuit comprising a pair of unilateral conducting devices and a measuring instrument connected thereto, means for applying alternating voltages derived from one of said oscillatory circuits to said unilateral conducting devices in push-pull relation, means for applying alternating voltages derived from the other of said oscillatory circuits to said unilateral conducting devices in parallel relation, and tuning means associated with at least one of said oscillatory circuits for adjusting the phase angle of the currents in said oscillatory circuits in order to obtain a predetermined reading upon said measuring instrument.

3. In a high frequency system, a pair of oscillatory circuits coupled with one another, a differential bridge circuit comprising a pair of unilateral conducting devices and a zero-reading measuring instrument connected thereto, means for applying alternating voltages derived from one of said oscillatory circuits to said unilateral conducting devices in push-pull relation, means for applying alternating voltages derived from the other of said oscillatory circuits to said unilateral conducting devices in parallel relation, and tuning means associated with at least one of said oscillatory circuits for effecting a phase adjustment of one circuit with respect to the other to obtain a zero reading upon said measuring instrument.

4. A high frequency system according to claim 2 wherein said pair of oscillatory circuits comprise the grid and plate circuits of an electron discharge tube and wherein one of said circuits is associated with said differential bridge circuit over a device adapted to impose a phase shift of 90 degrees upon the alternating voltages applied to said bridge circuit.

5. A high frequency system according to claim 1 wherein said grid circuit is associated with said differential bridge circuit over a device adapted to impose a phase shift of 90 degrees upon the alternating voltages applied in parallel relation to said bridge circuit.

ERICH SCHULZE-HERRINGEN.
FRITZ GUTZMANN.